No. 672,894. Patented Apr. 30, 1901.
A. C. ERICSSON & D. ANDERSON.
BINDER.
(Application filed Mar. 2, 1900.)
(No Model.)
3 Sheets—Sheet 1.

Witnesses.
A. H. Opsahl.
Elgie H E...

Inventors.
Anders C Ericsson
David Anderson
By their Attorneys
Merwin, Lothrop & Johnson

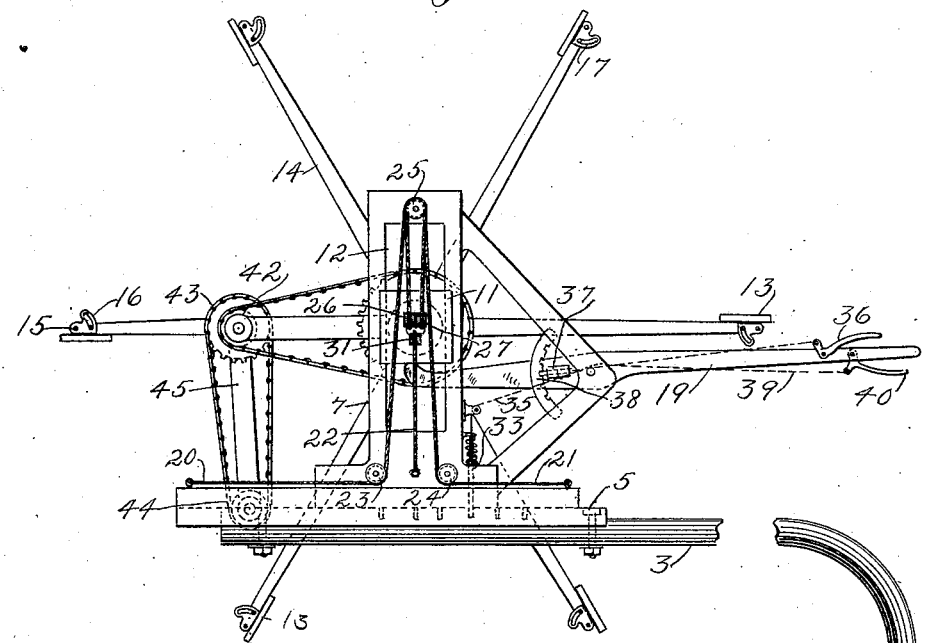

No. 672,894. Patented Apr. 30, 1901.
A. C. ERICSSON & D. ANDERSON.
BINDER.
(Application filed Mar. 2. 1900.)
(No Model.) 3 Sheets—Sheet 3.

Witnesses
A. H. Opsahl
Elgil H. Evans

Inventors
Anders C. Ericsson
David Anderson
By their Attorneys
Merwin, Lothrop & Johnson

UNITED STATES PATENT OFFICE.

ANDERS C. ERICSSON AND DAVID ANDERSON, OF SALEM, SOUTH DAKOTA.

BINDER.

SPECIFICATION forming part of Letters Patent No. 672,894, dated April 30, 1901.

Application filed March 2, 1900. Serial No. 7,067. (No model.)

*To all whom it may concern:*

Be it known that we, ANDERS C. ERICSSON and DAVID ANDERSON, citizens of the United States, residing at Salem, in the county of McCook and State of South Dakota, have invented certain new and useful Improvements in Binders, of which the following is a specification.

Our invention relates to improvements in binders, and particularly in the construction of the reel and in the means for adjusting the position of said reel.

Figure 1:
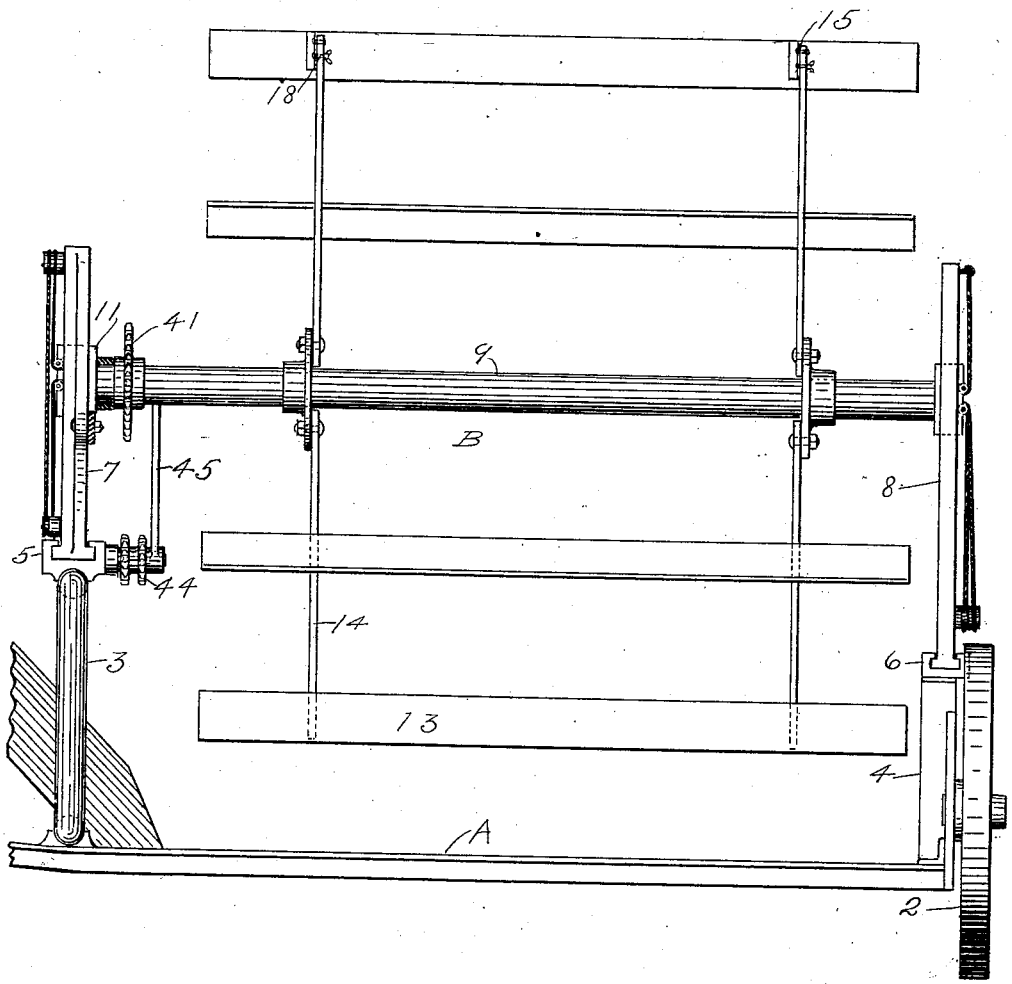
Figure 4:
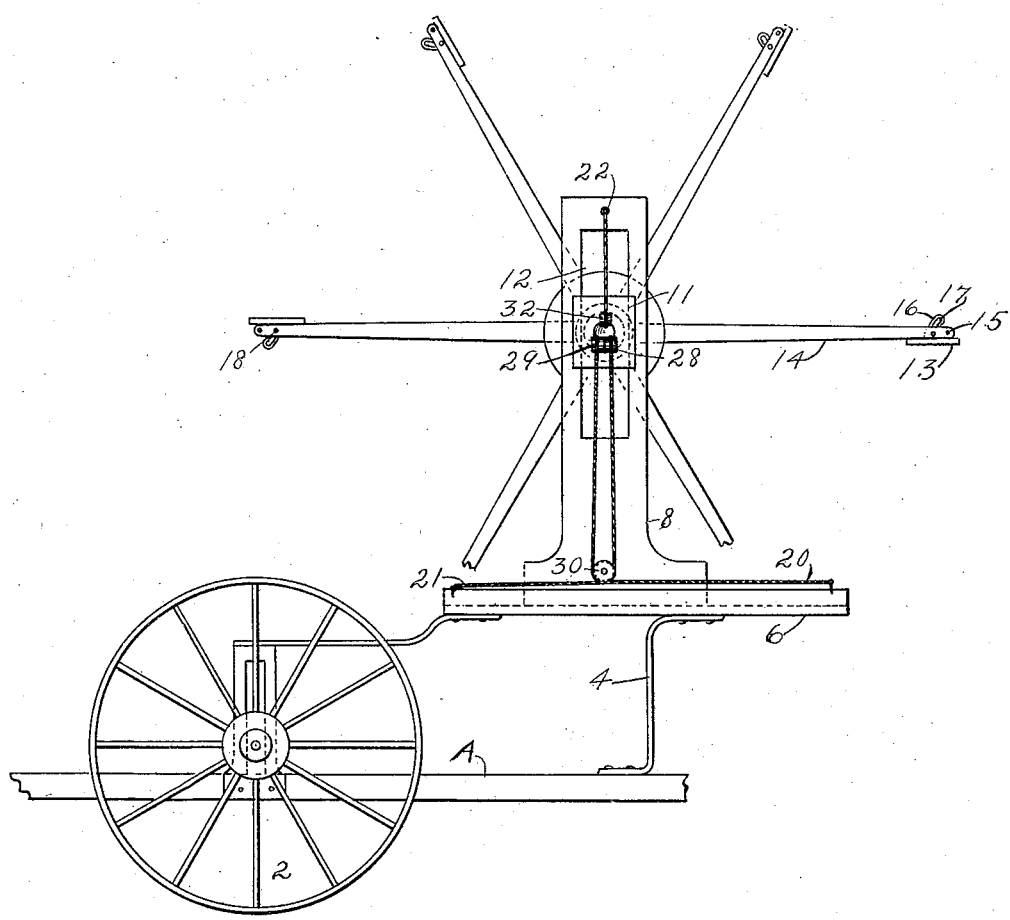
Figure 5:
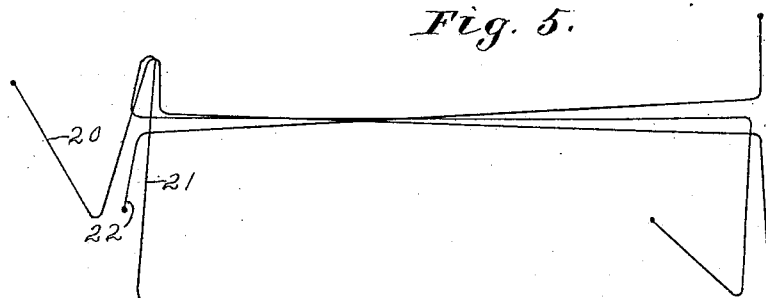

In the accompanying drawings, forming part of this specification, Figure 1 is a front elevation of the reel-carrying part of the binder. Fig. 2 is an elevation of one end of the reel. Fig. 3 is a detail of one end of the reel with its supporting-shaft partly broken away. Fig. 4 is an end elevation of the reel opposite to that shown in Fig. 2, and Fig. 5 is a view of the operating cables or cords.

In the drawings, A represents the cutter-bar platform, and 2 the carrying-wheels. Supported upon the framework 3 and 4 at the opposite ends of the platform are the guides 5 and 6. Slidable in the guides 5 and 6 are frames 7 and 8.

B represents the reel, the central shaft 9 of which incloses and rotates upon a hollow shaft 10. The ends of the hollow shaft 10 are secured to boxes 11, which are slidable in the vertical openings in the frames 7 and 8, said boxes 11 forming bearings for the ends of the shaft 9. The blades 13 of the reel are pivotally supported on the ends of the arms 14 by means of pivots 15 and are adjustable upon said pivots by means of the blades 16, each provided with a curved slot 17, in which a pin 18 on the arm 14 projects. The pins 18, as shown in Fig. 3, are provided with thumb-nuts, by means of which the blades are secured in adjusted positions. In order to adjust the height of the reel, we provide a lever 19, having a fulcrum-support in the frame 7 and connected at its inner end with the adjacent box 11 of the reel-shaft. In order to simultaneously raise the opposite ends of the reel as power is applied through the lever 19, we provide a series of cables passing through the hollow reel-shafts and connected with the opposite frames 7 and 8. As shown in Fig. 5, there are three cables 20, 21, and 22. The cables 20 and 21 are connected to the opposite ends of the bottom of the guide 5, from where they are carried around the pulleys 23 and 24, upward and around the pulley 25, thence down around pulleys 26 and 27, through the shaft, where they are crossed over the pulleys 28 and 29 at the opposite end of the shaft, thence down around the pulley 30, and thence to points of attachment with the opposite ends of the guides 6. The cord 22 is connected to the lower part of the frame 7, passing around pulley 31, through the reel-shaft, over a pulley 32, and thence to a point of attachment with the upper end of the frame 8. It will be seen that the cables which at one end of the reel pass from the shaft downward at the opposite end pass from the shaft upward, so that as one end of the reel is raised by its actuating-lever the cables in being held taut will evenly raise the opposite ends of the reel. In order to secure the reel in horizontally-adjusted positions, the pin 33, passing through the bottom of the frame 7, is adapted to project into openings 34 in the frame-guide. The pin is actuated by a cord 35, connected with a dog 36, carried by the lever. A pawl and ratchet 37 and 38, carried by the lever and frame 7, respectively, are provided to hold the reel in adjusted position, said pawl being actuated by a cord 39, connected with a dog 40, carried by the lever. The reel is actuated through the medium of chain-connected sprockets 41, 42, 43, and 44, connecting the reel-shaft with the operating parts of the machine and supported by lever-arms 45.

The important features of our invention are the means for adjusting the position of the blades of the reel, allowing the blades to be positioned to properly strike different heights of grain, and, second, for slidably supporting both ends of the reel, and the cables for causing both ends to be evenly raised.

We claim—

1. In a binder, the combination with the reel, of framework supporting both ends thereof, and the means for raising and lowering said reel, and cables passing through the shaft of the reel and secured adjacent the ends thereof, as and for the purpose set forth.

2. In a binder, the combination with the reel mounted upon a hollow shaft, of framework supporting both ends of said reel, a lever bearing against one end of said reel, and adapted to be actuated to raise and lower the same, and cables passing through the shaft of the reel and secured to the framework, as and for the purpose set forth.

In testimony whereof we affix our signatures in presence of two witnesses.

ANDERS C. ERICSSON.
   DAVID ANDERSON.

Witnesses:
 ELGIE H. EVANS,
 H. S. JOHNSON.